US010165392B2

(12) United States Patent
Maria

(10) Patent No.: US 10,165,392 B2
(45) Date of Patent: Dec. 25, 2018

(54) ACCESS OF VIRTUAL RESOURCES BASED ON A CONTEXTUAL FRAME OF REFERENCE

(71) Applicant: AT&T Mobility II LLC, Atlanta, GA (US)

(72) Inventor: Arturo Maria, Bellevue, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 418 days.

(21) Appl. No.: 14/496,690

(22) Filed: Sep. 25, 2014

(65) Prior Publication Data
US 2016/0095044 A1    Mar. 31, 2016

(51) Int. Cl.
H04W 4/02 (2018.01)
H04L 12/46 (2006.01)

(52) U.S. Cl.
CPC .......... H04W 4/02 (2013.01); H04L 12/4641 (2013.01)

(58) Field of Classification Search
CPC ............................. H04W 4/02; H04L 12/4641
See application file for complete search history.

(56) References Cited

U.S. PATENT DOCUMENTS

| 8,340,633 | B1 | 12/2012 | Rege et al. |
| 8,474,027 | B2 | 6/2013 | Meijer et al. |
| 8,707,302 | B2 | 4/2014 | DeLuca et al. |
| 8,732,310 | B2 | 5/2014 | Breitgand et al. |
| 9,172,724 | B1* | 10/2015 | Reddy .................. H04L 63/20 |
| 2011/0126197 | A1 | 5/2011 | Larsen et al. |
| 2011/0231840 | A1 | 9/2011 | Burch et al. |
| 2012/0233549 | A1 | 9/2012 | Ricci |
| 2012/0311568 | A1 | 12/2012 | Jansen |
| 2013/0121207 | A1 | 5/2013 | Parker |
| 2013/0318522 | A1* | 11/2013 | Devireddy .......... H04L 12/6418 718/1 |
| 2014/0040888 | A1 | 2/2014 | Bookman et al. |
| 2014/0181296 | A1* | 6/2014 | Lee ...................... H04L 41/28 709/224 |
| 2014/0258450 | A1* | 9/2014 | Suryanarayanan ......... H04L 67/1097 709/217 |

OTHER PUBLICATIONS

Silva, Peter, "Secure, Optimized Global Access to Corporate Resources", F5 Networks, Inc., White Paper, 2011.

* cited by examiner

Primary Examiner — Un C Cho
Assistant Examiner — Jeremy M Costin
(74) Attorney, Agent, or Firm — Guntin & Gust, PLC; Mark Wilinski

(57) ABSTRACT

Aspects of the subject disclosure may include, for example, a network device that performs operations include determining a context of a communication device operable within a mobility network, wherein the communication device interacts with a virtual resource manager to allow a user of the communication device to access a virtual resource by way of a user interface at the communication device. The virtual resource is hosted by another system remotely accessible to the communication device by way of the mobility network. An access parameter is determined based on the context of the communication device and forwarded to the communication device by way of the mobility network. The communication device is enabled to access the virtual resource based on the access parameter. Other embodiments are disclosed.

20 Claims, 7 Drawing Sheets

300

400

ACCESS OF VIRTUAL RESOURCES BASED ON A CONTEXTUAL FRAME OF REFERENCE

FIELD OF THE DISCLOSURE

The subject disclosure relates to access of virtual resources based on a contextual frame of reference, and more particularly to access of virtual resources by communication devices based on a contextual frame of reference of the communication devices.

BACKGROUND

Telecommunication users access virtual resources hosted by another, such as an enterprise organization. The virtual resources can include, for example, a Virtual Desktop Infrastructure (VDI) to access a Virtual Machines (VM). In other words, when an enterprise mobile user wants to access an enterprise VM, the enterprise user clicks on an icon displayed on a user interface of their mobile device. Clicking the icon launches an application that accesses a VM security resource (such as VMWare View Manager), which subsequently connects to an appropriate VM. The telecommunication device is generally preconfigured with the icon and accompanying application that links the device to the virtual resources of the enterprise system.

BRIEF DESCRIPTION OF THE DRAWINGS

Reference will now be made to the accompanying drawings, which are not necessarily drawn to scale, and wherein.

DETAILED DESCRIPTION

Figure 1:
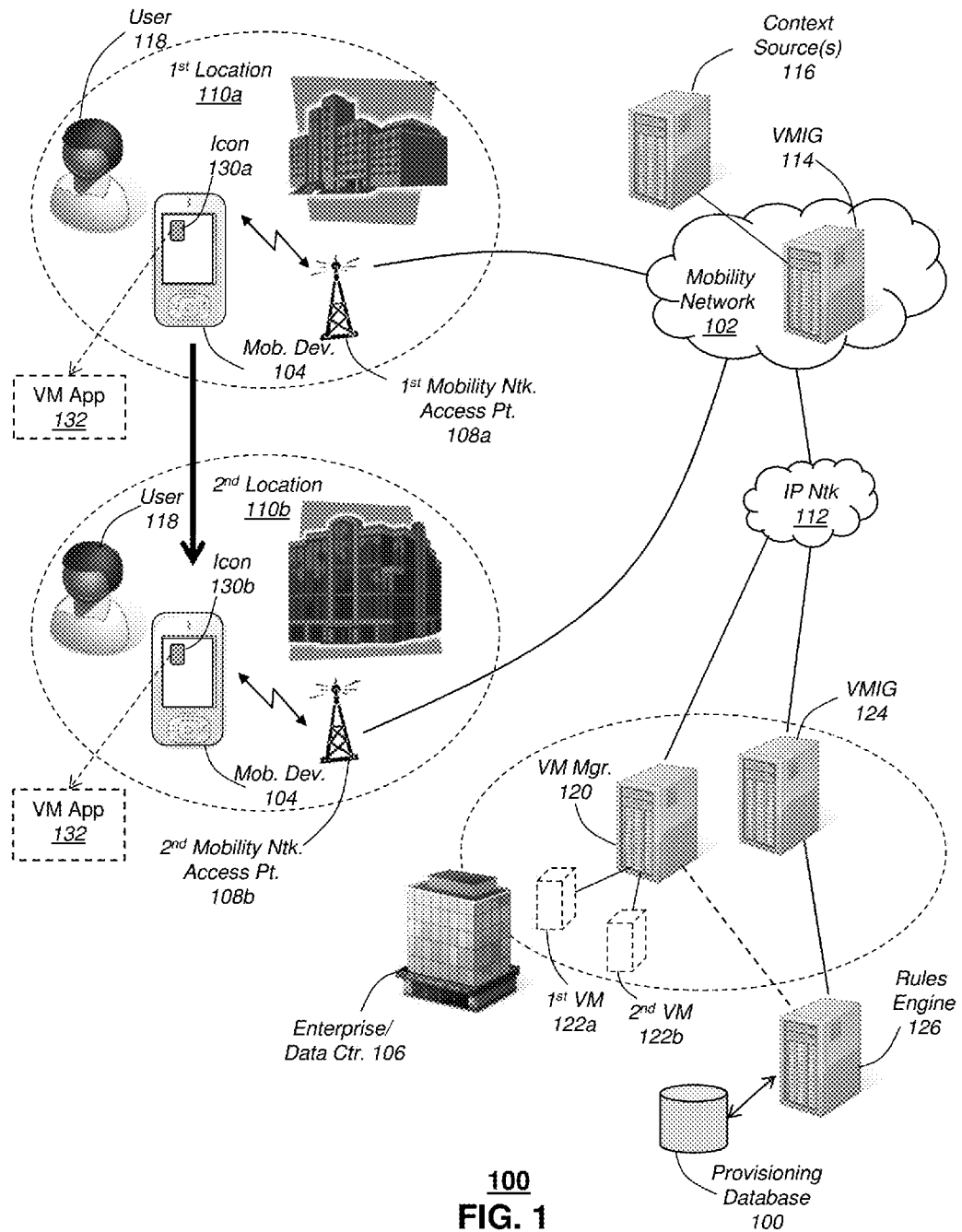
FIG. 1 depicts an illustrative embodiment of a communication system having a mobility network that provides a contextual frame of reference for accessing virtual resources.

There is an increasing trend towards virtualization of information services, user applications and even devices. Benefits, to name a few, include unprecedented flexibility in provisioning equipment, services and/or security. This is particularly true for mobile users for which sensitive information can be made available to mobile devices, while the information itself remains safely within the control of an enterprise. Thus, virtualization provides some reassurance against loss or compromise of a mobile device.

Mobile devices can include resident applications, i.e., clients, allowing a user of the mobile device to access virtual resources hosted elsewhere. For mobile devices having graphic user interfaces, the application can be accessed by way of an icon displayed at the graphical user interface. Generally, one or more of the icon, security settings, view management or virtual machine access need to be pre-defined and/or pre-configured by an enterprise organization. Such pre-configuration can include information or parameters that are stored locally on or otherwise provided by the mobile device, e.g., during a request for access. The parameters can be used in an exchange between the mobile device application and a virtual resource manager to coordinate access to the virtual resources.

The need for pre-configuration of mobile devices can pose challenges to accessing virtual resources of the enterprise organization. Namely, if pre-configuration relies on a contextual frame of reference of the mobile device, and some aspect of that frame of reference changes, the pre-configuration can be invalidated or otherwise compromised. By way of non-limiting example, the contextual frame of reference can include one or more of a location, a device type, an identity, a virtual machine or elements of security required, such as a security element upon which access to the virtual resource depends. In some instances, the contextual frame of reference includes one of a characteristic of the virtual resource. Heretofore, the enterprise cannot dynamically change such settings on-the-fly, when presented to changes in the contextual frame of reference of the mobile device.

The subject disclosure describes, among other features, illustrative embodiments of processes, network elements and software that determine an updated context of mobile usage and dynamically alter one or more of the access parameters, requirements and/or resources available to the equipment of the mobile enterprise user to allow access to the virtual machine environment of the enterprise organization. Other embodiments are described in the subject disclosure.

One or more aspects of the subject disclosure include a network element and associated processes that take advantage of mobile network carrier information such as a location based service to develop a contextual frame of reference for equipment of mobile enterprise users. The contextual information can be used to tailor access to virtual resources of the enterprise organization, such as virtual machine(s) and/or virtual desktop infrastructure(s). In other words, a mobile network carrier provides information, e.g., access parameters, to an application program resident in a mobile device, which in turn, tailors access of the mobile device to the virtual resources based on the contextual information. Advantageously for the enterprise and enterprise users, access to the virtual resources can be tailored based on the contextual information to ensure the proper resources are made available to authorized users according to the contextual frame of reference. Advantageously for the mobile network carrier, offers of new services can be made that monetize this information and provide a strategic advantage to users of virtual resources, such as cloud based services.

One embodiment of the subject disclosure includes a process that determines, by a network entity including a processor, a state of a mobile device operable within a mobility network. The mobile device includes a client that interacts with a virtual resource manager to allow a user of the mobile device to access a virtual resource of an enterprise organization by way of a user interface at the mobile device. The virtual resource is hosted by another system remotely accessible to the mobile device by way of the mobility network. The process further includes determining, by the network entity, a contextual frame of reference of the mobile device based on the state of the mobile device. The network entity determines an access parameter based on the contextual frame of reference of the mobile device and forwards the access parameter to the mobile device by way of the mobility network. The client is generally enabled to access the virtual resource based on the access parameter.

Another embodiment of the subject disclosure includes a network device having a memory that stores executable instructions and a processor coupled to the memory. The processor, responsive to executing the instructions, facilitates performance of operations including determining a contextual frame of reference of a communication device operable within a mobility network. The communication device includes an application that interacts with a virtual resource manager to allow a user of the communication device to access a virtual resource of an enterprise organization. The virtual resource is hosted by another system remotely accessible to the communication device by way of the mobility network. An access parameter is determined based on the contextual frame of reference of the communication device and forwarded to the communication device by way of the mobility network. The application of the communication device is enabled to access the virtual resource based on the access parameter.

Yet another embodiment of the subject disclosure includes a machine-readable storage device, including executable instructions that, responsive to being executed by a processor, cause the processor to facilitate performance of operations. The operations include determining a context of a communication device operable within a mobility network, wherein the communication device interacts with a virtual resource manager to allow a user of the communication device to access a virtual resource by way of a user interface at the communication device. The virtual resource is hosted by another system remotely accessible to the communication device by way of the mobility network. An access parameter is determined based on the context of the communication device and forwarded to the communication device by way of the mobility network. The communication device is enabled to access the virtual resource based on the access parameter.

FIG. 1 depicts an illustrative embodiment of a communication system 100 including a mobility network 102 that provides a contextual setting of a mobile device 104, sometimes referred to as a contextual frame of reference, to support mobile access of virtual resources hosted by another entity, such as an enterprise data center 106. The mobility network 102 includes a first mobility network access point 108a at a first location 110a and a second mobility network access point 108b at a second, separate location 110b. The communication system 100 also includes another network, such as an internet protocol network 112 in communication with the mobility network 102 and one or more other elements of the system 100. The system 100 can include other networks, not shown, such as local area networks, e.g., at the first location 110a and/or back haul networks of the mobile network carrier and/or personal area networks at the first or second locations 110a, 110b (generally 110).

The mobility network 102 can subscribe to any suitable wireless communications protocol, such as the various mobile network protocols disclosed herein, e.g., GSM, CDMA, TDMA, UMTS, WiMax, SDR, and LTE, and so on. The mobility network 102 includes a network element that receives state information from one or more context sources 116. In the illustrative example, the network element is referred to as a mobile carrier virtual mobile gateway 114. The mobile carrier virtual mobile gateway 114 receives state information from one or more sources, such as the context source 116. The context source 116 can represent back-end equipment of the mobile network carrier and/or third party equipment that can be provided locally at the mobile carrier network facilities, or remotely accessible, e.g., by the IP network 112. State information can include, without limitation, one or more of a location of the mobile device 104, a location of a mobile enterprise user 118, an equipment type of the mobile device 104, a presence within the network 102, 112 or a time reference, such as a time zone and/or a time of day. Other examples include, e.g., an operating system of the mobile device, a level of software revision, a network carrier being used, a specific country, biometrics information, level of authentication.

In some embodiments, the virtual resources can be hosted by the enterprise data center 106, as shown, and made accessible to the mobile device 104 by way of the mobility network 102 and the IP network 112. It is generally understood that the virtual resources can also be hosted by a separate data center, such as a cloud service provider. In the illustrative example, the enterprise data center 106 includes a virtual network elements, such as a resource manager 120 that hosts or otherwise supports mobile access to one or more virtual resources hosted elsewhere, such as virtual machines 122a, 122b (generally 122).

The enterprise data center 106 also includes an enterprise virtual mobile gateway 124 in communication with the mobile carrier virtual mobile gateway 114. For example, the enterprise virtual mobile gateway 124 can be provided in what can be referred to as a de-militarized zone (DMZ) of the enterprise data center 106. The DMZ refers to a physical or logical sub-network that contains and exposes the enterprise data center's external-facing services to a larger and untrusted network, usually an IP network 112, such as the Internet. The enterprise virtual mobility gateway 124, when provided, can facilitate communications between the enterprise data center 106 and the mobile carrier virtual mobile gateway 114 to promote a timely and efficient exchange of context information and access parameters. When the enterprise virtual mobile gateway 124 is not present, the mobile carrier virtual mobile gateway 114 can communicate directly with one or more of the rules engine 126 and the virtual resource manager 120. The virtual resource manager 120 is sometimes referred to as a view connection server—a connection broker that manages secure access to virtual desktops 122a, 122b, or a hypervisor or a virtual machine monitor identified as a host machine 120 that creates and runs one or more virtual machines 122. The virtual resource manager 120 can be one of a VMware® View Manager, a Red Hat® Virtual Machine Manager, Oracle VM Virtual Box, Hypervisor a Citrix Servers.

In operation, the mobile device 104 at the first location 110a accesses services of the mobility network 102 by way of a wireless link between the mobile device 104 and the first mobility network access point 108a. The context source 116 provides one or more state variables or states of the mobile device 104 and/or the mobile enterprise user 118 to the mobile carrier virtual mobile gateway 114. For example, the mobility network 102 can identify one or more of the mobile device 104 and the mobile enterprise user 118 through well-established techniques, e.g., according to information provided by a Subscriber Identity Module (SIM) of the mobile device 104. An identity of the user 118 can be obtained directly from the SIM information or through a look up procedure associating mobile subscribers with particular devices.

Alternatively or in addition, a location based service can be used to obtain an identity of one or more of a location of the user 118 or the mobile device 104. Location based services can rely on one or more of self-reported location, e.g., geo-coordinates reported by a GPS receiver of the mobile device 104, association with a location of a nearby device, such as the mobility network access point 108a, or estimates, including triangulation determined by one or more of wireless signal strength and propagation delay. It is envisioned that the access point 108a can include one of a cell tower and related radio access terminal, or base station, a wireless access point, such as a WiFi adapter, a femtocell or a combination thereof. Time references can be obtained by system clock of the mobile device, network time maintained by the mobile network carrier, and time zone information. Security context can include one or more of biometric information obtained from the user, e.g., a fingerprint of the user obtained by a fingerprint scanner of the mobile device 104, a voice sample obtained by a voice recorder of the mobile device, a password or similar keyword provided by the user 118, and the like. Thus, the context source 116 can be operated by the mobile network carrier, by one or more third parties, or some combination of both.

The virtual resource server 120 can be in communication with a rules engine 126, as shown, sometimes referred to as a knowledge engine or more generally as Artificial Intelligence (AI). In the illustrative example, the rules engine 126 is in communication with one of the virtual resource manager 120, the enterprise virtual mobile gateway 124 or both. The rules engine 126 is in further communication with a source of one or more rules that support access of the virtual resources 122 by the mobile device 104.

The rules engine 126 receives the contextual frame of reference for the mobile device 104 from the enterprise virtual mobile gateway 124, when provided. Otherwise, the rules engine 126 receives the context information directly from the mobile carrier virtual mobile gateway 114. The rules engine 126 then determines a particular manner in which the mobile enterprise user 118 will be provided access to the virtual resources 122 by way of the mobile device 104. For example, the rules engine 126 correlates the contextual frame of reference to one or more preconfigured or otherwise predetermined rules. The correlated rules determine appropriate action(s), including access parameters, for establishing mobile access to the virtual resources 122. The rules can be stored locally at the rules engine 126, stored remotely in a rules database or provisioning database 128 in communication with the rules engine 126, or some combination thereof.

In further operation, the mobile device 104 receives a user selection of an icon 130 presented at a graphic user interface. The icon 130 can include one of a graphic image, textual information or both, indicative of one of the enterprise data center 106, the virtual resources 122 or both. Selection of the icon 130 launches an application program 132 resident at the mobile device 104, which initiates access to the virtual resources 122. In at least some embodiments, the application program provides one or more parameter values to the virtual resource manager 120. The virtual resource manager 120, in turn, provides the mobile device 104 with access to the virtual resources 122 based on values of the parameters. Thus, the mobile enterprise user 118 can access a virtual machine 122 and/or a virtual desktop infrastructure through the mobility network 102.

The access parameter values can include identification of one of a particular virtual machine, a particular virtual desktop infrastructure, a particular application, or a combination thereof, referred to generally as virtual resources, hosted by the enterprise data center 106. Likewise, the access parameter values can include identification of a particular presentation, e.g., a format, of the virtual resource(s), and/or access to particular data sources. In some instances, the access parameter values can be referred to generally as a virtual mobile identity. Thus, the mobile enterprise user, by simply selecting the icon 130, accesses intended virtual resources that have been pre-configured according to the particular equipment of the mobile device 104. For example, the virtual desktop infrastructure is presented at the graphical user interface of the device 104 according to a particular screen size, processing capability and/or network conditions, e.g., available bandwidth and/or quality of service. Likewise, the mobile enterprise user 118 has access to the appropriate data sources.

By way of illustrative example, the mobile enterprise user 118 is a California physician who under state law is a contractor at both Stanford Medical and at U.C. San Francisco Medical Center. When the physician 118 is at a first location 110a, corresponding to Stanford Medical or one of the supporting clinics in the Palo Alto area using his tablet device 104, the client application residing on the device 104 requests an update to the virtual desktop infrastructure configuration, from the mobile carrier virtual mobile gateway 114. The mobile carrier virtual mobile gateway 114 sends the mobile client an update including a first icon 130a and security settings. When the physician 118 clicks on the first icon 130a, indicative of Stanford Medical, the physician is provided mobile access to Stanford Medical Clinical Information Systems.

When the same physician 118 travels north on Highway 101 to a second location 110b, downtown San Francisco, the mobility network 102 is notified that the location of the mobile tablet device 104 has changed. The mobile carrier virtual mobile gateway 114 obtains the new location from a location based service, e.g., the context source 116, and subsequently updates one or more settings based on entries of the provisioning database 126 and application of corresponding rules provided by the rules engine 126. The mobile carrier, virtual mobile gateway 114 then sends a new message to the client residing on the physician's mobile tablet 104. The client, in turn, updates the icon 130b to something indicative of the U.C. San Francisco Medical Center. The security settings or parameter values are also updated corresponding to U.C. San Francisco Medical Center and one or more enterprise servers to be accessed. When the same physician 118 clicks on the updated icon 130b, the client application obtains the corresponding parameter values, which it supplies, in turn, to the enterprise data center 106. Consequently, the physician 118 achieves access to virtual resources of the U.C. San Francisco Medical Center Clinical Information Systems.

It is envisioned that the architectural alternative set forth herein can support all enterprise customers, regardless of their location in the world. A contextual frame of reference can include a nationality and/or language or dialect, as well as other access and/or usage restrictions that might be imposed by one or more institutions or governments.

Figure 2:
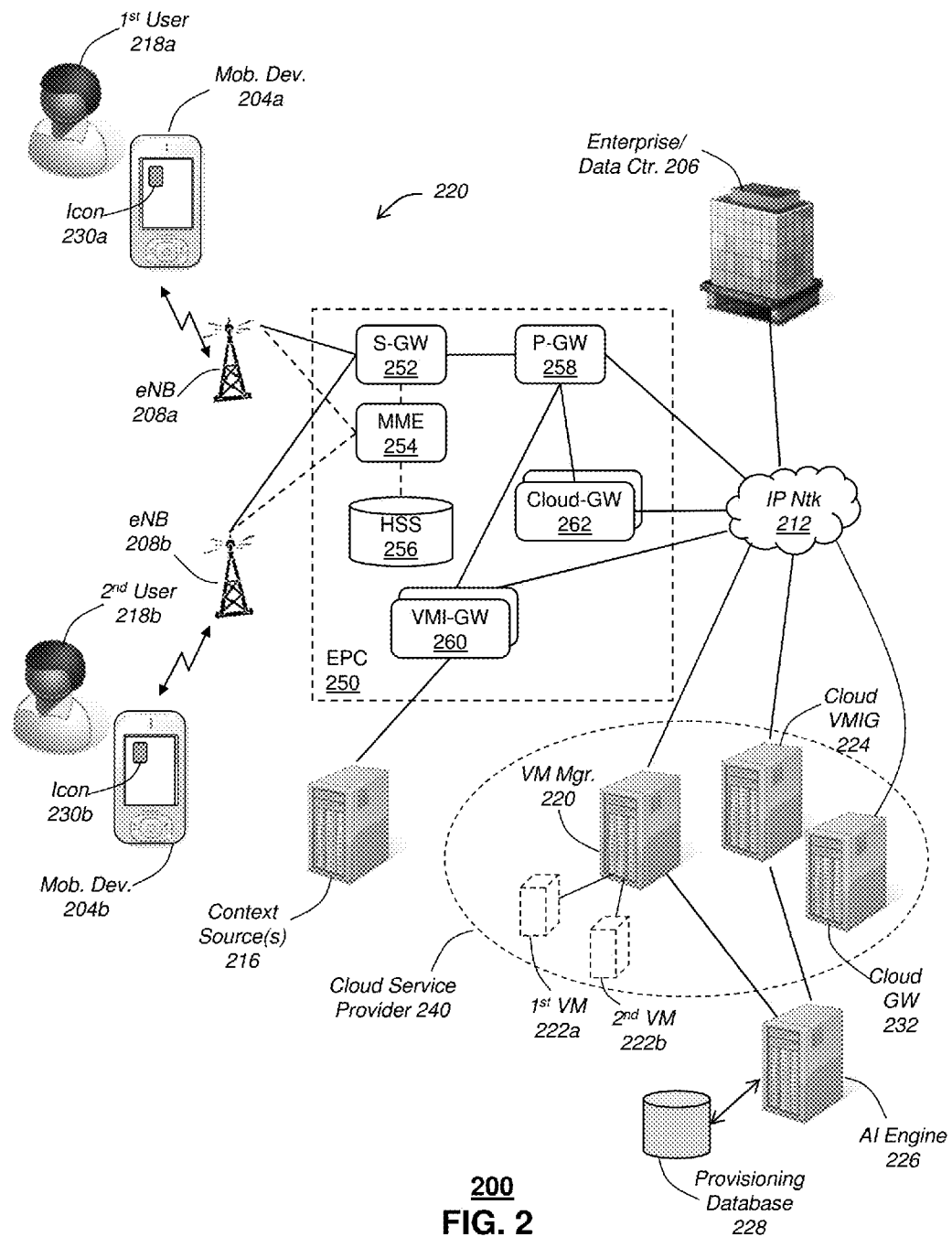
FIG. 2 depicts an illustrative embodiment of another embodiment of a communication system having a mobility network that provides a contextual frame of reference for accessing virtual resources.

FIG. 2 depicts an illustrative embodiment of another communication system 200 having an LTE mobility network 202 that provides a contextual frame of reference for accessing virtual resources. In particular, the LTE mobility network 202 includes first and second enhanced node B's (eNB) 208a, 208b (generally 208), in communication with an LTE core network 250. The LTE core network 250 includes the usual serving gateway (S-GW) 252, the mobility management entity (MME) 254, the home subscriber server (HSS) 256, and a packet data network (PDN) gateway (P-GW) 258. The core network 250, however, also includes one or more mobile carrier virtual mobile gateways 260 and in at least some instances, one or more cloud service gateway processors 262.

The system 200 also includes a context source 216, an IP network 212, an enterprise facility or data center 206 and a cloud service provider suite 240. The enhanced packet core 250 is in communication with the context source 216, the enterprise data center 206 and the cloud service provider suite 240. Communications can be through one of the IP network 212, a backend network or both.

The cloud service provider suite 240 includes a virtual resource manager 220 that hosts or otherwise coordinates hosting of one or more virtual resources, such as virtual desktop infrastructures or virtual machines 222a, 222b (generally 222). In at least some embodiments, the cloud service provider suite 240 includes a cloud virtual mobile gateway 224. One or more of the virtual resource manager 220 and the cloud virtual mobile gateway 224 is in communication with a rules engine 226, which is in further communication with a rules or provisioning database 228.

In operation, a first mobile device 204a receives a request of a first mobile enterprise user 218a to accesses a first virtual resource 222a of the enterprise data center 206. The request can be determined according to a selection of a first icon 230a displayed on a graphic user interface of the first mobile device 204a. The mobile carrier virtual mobile gateway 260 receives state information related to a contextual frame of reference of the first mobile device 204a. The mobile carrier virtual mobile gateway 260 provides the contextual frame of reference to the cloud virtual mobile gateway 224, which shares the contextual frame of reference with the rules engine 226. The rules engine 226 proceeds to correlate the contextual frame of reference with a set of rules, e.g., stored in the provisioning database 228, to determine one or more rules corresponding to the contextual frame of reference and suitable for providing the first mobile device 204a with access to the first mobile resource 222a.

Likewise, a second mobile device 204b receives a request of a second mobile enterprise user 218b to accesses a second virtual resource 222b of the enterprise data center 206. The request can be determined according to a selection of a second icon 230b displayed on a graphic user interface of the second mobile device 204b. The mobile carrier virtual mobile gateway 260 receives state information related to a contextual frame of reference of the second mobile device 204b, and provides the contextual frame of reference to the cloud virtual mobile gateway 224. The cloud virtual mobile gateway, in turn, shares the contextual frame of reference of the second mobile device 204b with the rules engine 226, which proceeds to correlate that contextual frame of reference with the set of rules to suitable for providing the second mobile device 204b with access to the second mobile resource 222b It is envisioned that one or more of the network elements disclosed herein, such as the mobile carrier virtual mobile gateway 114, 214 or the virtual resource manager 120, 220 can be implemented as a software defined network element. Such software defined implementations support virtual implementations of the gateways 114, 224, 120, 220, 262 on demand, and across one or more data centers 106, 206.

It is also envisioned that multiple instances of the mobile carrier virtual mobile gateway 114, 224 can be hosted in one centralized network element. In other words, potentially every enterprise customer could have a virtual instance of a mobile carrier virtual mobile gateway 114, 214. However, it is further envisioned that all mobile carrier virtual mobile gateways 114, 214 associated with a particular data center 106, 206 share a common set of provisioning databases, catalogs and servers. Consider a single physical server of the mobility network 102, 202 hosting one or more distinct mobile carrier virtual mobile gateways 114, 214. Such distinct software defined network elements can be used as dedicated gateways 114, 214 for respective different data centers 106, 206.

In another embodiment the carrier virtual mobile gateway 214 is supported by a virtual mobile gateway cloud manager 262. The virtual mobile gateway cloud manager 262 includes two network elements: a network virtual mobile gateway cloud manager residing in the mobility network 202, such as the LTE core network 250 and a provider virtual mobile gateway cloud manager 232 residing in premises of a cloud services provider 240.

The virtual mobile gateway cloud manager 224 can mimic the services of the enterprise virtual mobile gateway 124 (FIG. 1) residing in the enterprise data center 106 when these services are hosted by a cloud services provider. In other words, the virtual mobile gateway cloud manager 262 in the LTE core network interfaces with a virtual mobile gateway cloud manager 232 residing in the cloud services provider datacenter 240. Both network elements 262, 232 interface with the mobile carrier virtual mobile gateway 260 residing in the LTE core network 250 to perform and provide various services, such as those disclosed herein.

It is envisioned that the virtual mobile gateway cloud managers 262, 232 can be implemented as a standalone network elements, attached processors or software defined network elements. It is also envisioned that several instances of the virtual mobile gateway cloud manager 262 residing in the LTE core network can be implemented as separate instances of virtual machines, e.g., a respective one for each of the first and second users 218a, 218b.

Figure 3:
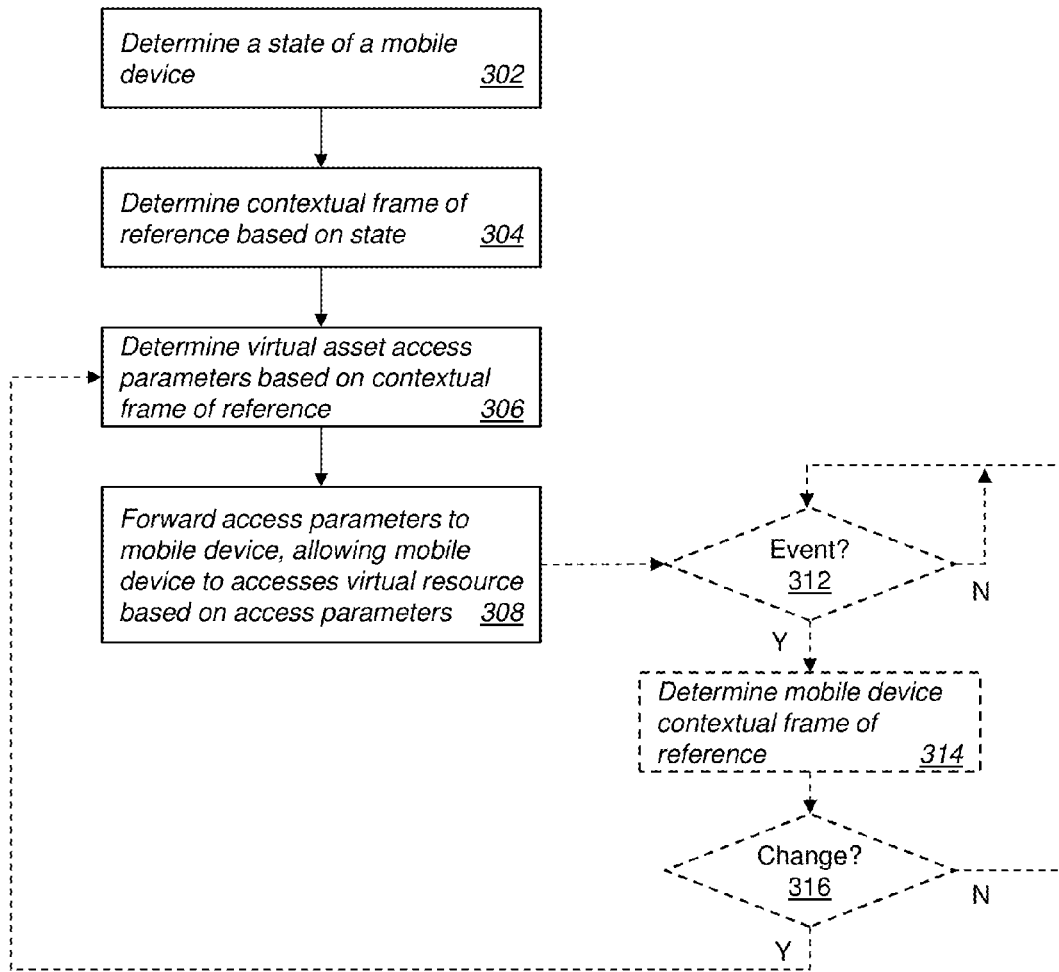
FIG. 3 depicts an illustrative embodiment of a process used in portions of the system described in FIGS. 1 and 2.

FIG. 3 depicts an illustrative embodiment of a process 300 used in portions of the systems 100, 200 described in FIGS. 1 and 2. A state of a communication device, such as the mobile devices 104, 204 is determined at 302. One or more state variables associated with one of the mobile device, the user or both can be determined Determination of the state variable(s) can be accomplished by one of equipment of a network service provider, equipment of the enterprise user 118, 218, third party equipment, or a combination thereof. For example, a state variable can include an equipment identification number or similar identifier to allow for identification of a make, model and/or configuration of the mobile device 104, 204. Examples of configuration information can include operating system version, application software version(s) and available memory. State variables can also include network performance variable, such as available/assigned communication bandwidth, quality of service, error rates, and so on. Still other state variables can include location(s), security parameter(s) and/or other user preferences.

A contextual frame of reference is determined at 304 based on the one or more states determined. Determination of the contextual frame of reference can range from simply identifying the state determined variables to combining or otherwise processing the state variable(s) to determine the context information. Determination of the context information can be accomplished by one of the mobile carrier virtual mobile gateway 114, 260, the mobile device 104, 204, the enterprise virtual mobile gateway 124, 224 and the virtual mobile gateway cloud managers 262, 232 alone or in combination. By way of example, a contextual frame of reference can identify that the mobile device 104 is present at a first location 110a and that the user 118 is in possession of the mobile device 104. Examples of the state variables supporting this determination can include a location of the mobile device obtained from a location based service context source 116 and one or more user-supplied security parameter(s) received at the mobile device 104.

One or more access parameters are determined at 306 to support access of a virtual resource or asset based on the determined contextual frame of reference. The access parameter(s) are forwarded at 308 to the mobile device 104, 2034, allowing mobile device to accesses the virtual resource based on access parameters. Thus, the access parameters themselves can include one or more of identification of a particular virtual resource 122a, 222a, identification of an equipment type, a security parameter, and so on. Other examples of access parameters include, without limitation, network type, location, customer identification parameters, authentication parameters, profile names, etc. In some instances, the access parameters include an icon, or identification of a corresponding icon stored locally on the mobile device 104, 204. Thus, the user interface of the mobile device 104, 204 can provide a user 118, 218 with an indication as to which virtual resources are accessible at a given moment according to the contextual frame of reference.

Determination of the access parameters can include identifying a particular virtual resource 122a, 222a based on one of an identity of the user 118, 218, a location of the mobile device 104, 204 or both. Alternatively or in addition, determination of the access parameters can include identifying a particular application, application suite, or presentation format, e.g., based on one of an equipment type of the mobile device 104, 204, network condition(s), user preference(s) or a combination thereof. Thus, if the mobile device is limited in one or more of bandwidth, screen size, processing capacity, memory, etc., the access parameters are selected to allow the mobile device 104, 204 to provide a preferred experience to the user 118, 218.

In some embodiments the process further includes identifying an event at 312, determining a mobile device contextual frame of reference at 314, responsive to determining the event, and determining whether the contextual frame of reference has changed at 316. By way of illustrative example, an event can include a predetermined time interval. Thus, a contextual frame of reference is determined according to a prescribed schedule by way of a time interval. The time interval can be identified by one of the user, the enterprise organization, the network service provider or a combination thereof. Other events can include a change in a state parameter, e.g., a change in location, a change of equipment type, a change of user(s), and so on. Such changes can be detected by one of the communication device 104, 204, the mobility network 102, 202, the context source 116, 216, equipment of the enterprise organization and/or cloud service provider and combinations thereof. Still other events can include a user selection. For example, the mobile device 104, 204 can receive a user input, e.g., selection of an update icon, indicating that the contextual frame of reference should be determined or otherwise updated. In some instances, the events can include an indication by another, such as the enterprise organization and/or the network carrier service provider that the contextual frame of reference should be determined or otherwise updated. Some reasons for updates from the enterprise and/or network carrier can include recognition of a change, such as a reconfiguration of the network and/or resources under control of the enterprise service provider.

To the extent that the state variable(s) and/or contextual frame of reference have not changed, processing returns to determining an occurrence of the event at 312. However, to the extent that the contextual frame of reference has changed, processing proceeds to 306 to once again determine virtual asset access parameters based on contextual frame of reference, and forwarding the access parameters to the mobile device to access virtual resource based on the changed access parameters at 308. Once again, processing proceeds to the event monitoring loop at 312-316 after which the process repeats as set forth above.

Figure 4:
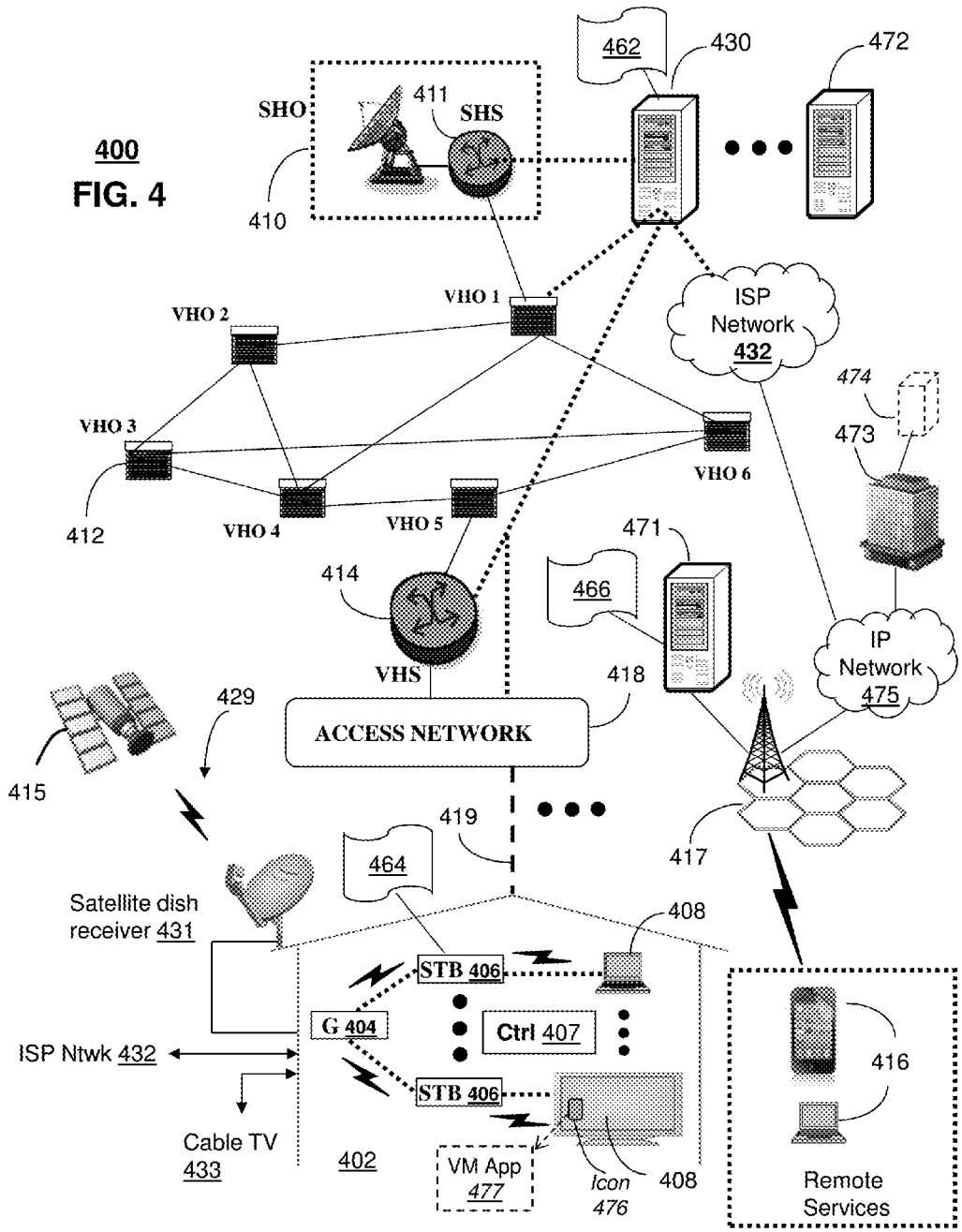
FIGS. 4-5 depict illustrative embodiments of communication systems that provide media services to mobile devices.

FIG. 4 depicts an illustrative embodiment of a first communication system 400 for delivering media content. The communication system 400 can represent an Internet Protocol Television (IPTV) media system. Communication system 400 can be overlaid or operably coupled with the communication systems 100, 200 of FIGS. 1 and/or 2 as another representative embodiment of communication system 400. For instance, one or more devices illustrated in the communication system 400 of FIG. 4 can determine a contextual frame of reference for a communication device operable within the communication network 400. In particular, the communication device can interact with a virtual resource manager to allow a user of the communication device to access a virtual resource by way of a user interface at the communication device. The virtual resource can be hosted by another system, such as an enterprise organization, data center or cloud service provider, remotely accessible to the communication device by way of the communication network 400. An updated access parameter can be determined based on the contextual frame of reference and forwarded to the communication device by way of the communication network 400. Having received the updated access parameter, the communication device can access the virtual resource based on the access parameter.

The IPTV media system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system. Some of the network elements of the IPTV media system 400 can be coupled to one or more computing devices 430, a portion of which can operate as a web server for providing web portal services over the ISP network 432 to wireline media devices 408 or wireless communication devices 416.

The communication system 400 can also provide for all or a portion of the computing devices 430 to function as a virtual access gateway (herein referred to as virtual access gateway 430). The virtual access gateway 430 can use computing and communication technology to perform a function 462, which can include among other things, determining a contextual frame of reference for a communication device operable within a communication network, wherein the communication device interacts with a virtual resource manager to allow a user of the communication device to access a virtual resource by way of a user interface at the communication device.

The communication device can include one or more of wireless communication devices 416, gateway 404, media processors 406 and media devices 408. The virtual resource, such as a virtual machine or virtual desktop infrastructure 474 can be hosted by another system, such as an enterprise organization 473, data center or cloud service provider, remotely accessible to the communication device by way of the communication network. An updated access parameter can be determined based on the contextual frame of reference and forwarded to the communication device by way of the communication network. Having received the updated access parameter, the communication device can access the virtual resource based on the access parameter.

For instance, the function 462 of virtual access gateway 430 can be similar to the functions described for the mobile carrier virtual mobile gateways 114, 214 of FIGS. 1 and 2, and in accordance with process 300 of FIG. 3. The media processors 406 and wireless communication devices 416 can be provisioned with software functions 464 and 466, respectively, to access virtual resources 474 hosted by the enterprise organization 473. For instance, the functions 464 and 466 of media processors 406 and wireless communication devices 416 can be similar to the functions described for the communication devices 104, 204 of FIGS. 1 and 2 in accordance with method 300 of FIG. 3.

In operation, selection of an icon 476 at a user interface of the media device 408 causes the software function 464 to request access to the virtual resource 474. The virtual gateway 430 is notified of the request for service and determines an updated contextual frame of reference for the communication device 406. The virtual gateway 430 forwards the context information to equipment of the enterprise organization 473. The equipment of the enterprise organization 473 returns corresponding access parameters based on the context information, which the virtual access gateway 430 forward to the communication device 406. Having obtained updated access parameters, the communication device 406 is enabled to access the virtual resources 474 of the enterprise organization 473.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
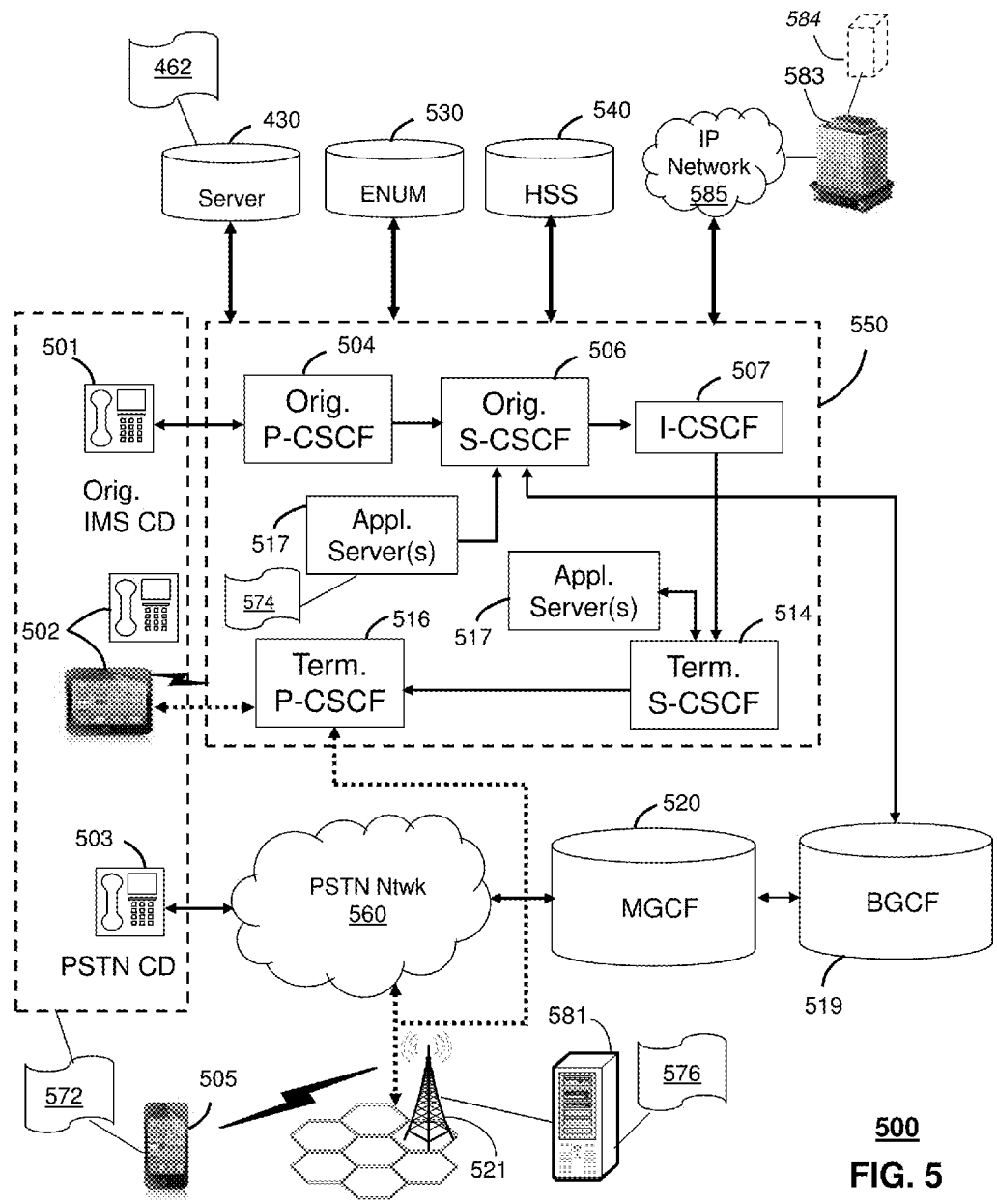

FIG. 5 depicts an illustrative embodiment of a communication system 500 employing an IP Multimedia Subsystem (IMS) network architecture to facilitate the combined services of circuit-switched and packet-switched systems. The communication system 500 can be overlaid or operably coupled with the system 100, 200 of FIGS. 1 and/or 2, and the communication system 400 of FIG. 4, as another representative embodiment of the communication system 500. For instance, one or more devices illustrated in the communication system 500 of FIG. 5 can determine a contextual frame of reference for a communication device 501, 502, 503, 505 operable within the communication network 500. In particular, the communication device 501, 502, 503, 505 can interact with a virtual resource manager to allow a user of the communication device to access a virtual resource 584 by way of a user interface at the communication device. The virtual resource 584 can be hosted by another system, such as an enterprise organization 583, data center or cloud service provider, remotely accessible to the communication device by way of the communication network 500. An updated access parameter can be determined based on the contextual frame of reference and forwarded to the communication device 501, 502, 503, 505 by way of the communication network 500. Having received the updated access parameter, the communication device 501, 502, 503, 505 can access the virtual resource 584 based on the access parameter.

The communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The virtual access gateway 430 of FIG. 4 can be operably coupled to communication system 500 for purposes similar to those described above. The virtual access gateway 430 can perform function 462 and thereby provide services to the CDs 501, 502, 503 and 505 of FIG. 5 based on a contextual frame of reference of the CDs 501, 502, 503 and 505 similar to the functions described for the servers 114, 214 of FIGS. 1 and 2 in accordance with process 300 of FIG. 3. The CDs 501, 502, 503 and 505, which can be adapted with software to perform function 572 to utilize the services of the virtual access gateway 430, similar to the functions described for the gateway 404 and communication devices 406, 416 of FIG. 4 in accordance with process 300 of FIG. 3. The virtual access gateway 430 can be an integral part of the application server(s) 517 performing function 574, which can be substantially similar to function 462 and adapted to the operations of the IMS network 550. For example, contextual information obtained from the CDs 501, 502, 503, 505 can be shared with the virtual access gateway 430 to allow for determination of a comprehensive contextual frame of reference, regardless of the CD 501, 502, 503, 505 being used to access any remote resources 584. Contextual information can be obtained in real time, historically, and/or a merger of real time and historical context. Rules, e.g., logic, for determining a contextual frame of reference can be determined beforehand, e.g., giving priority to real-time context information when available, and/or combining real-time context with historical context to draw inferences as to an appropriate contextual frame of reference.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
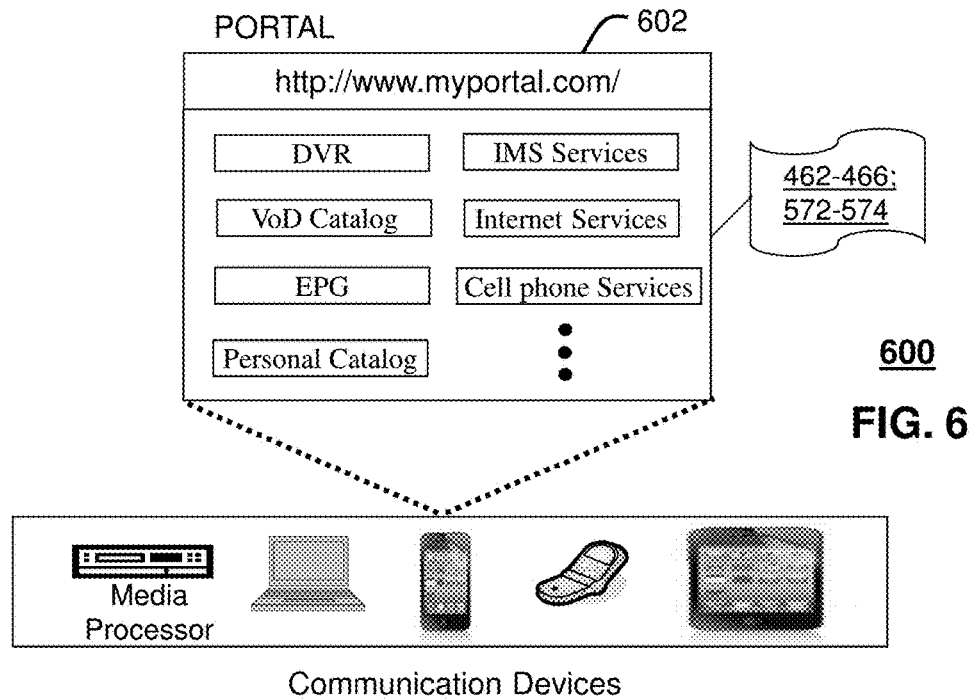
FIG. 6 depicts an illustrative embodiment of a web portal for interacting with the communication systems of FIGS. 1-2, and 4-5.

FIG. 6 depicts an illustrative embodiment of a web portal 602 of a communication system 600. Communication system 600 can be overlaid or operably coupled with the communication systems 100, 200 of FIGS. 1 and/or 2, the communication system 400 of FIG. 4, and/or the communication system 500 of FIG. 5 as another representative embodiment of the communication systems 100, 200, 400, 500. The web portal 602 can be used for managing services of one or more of the communication systems 100, 200, 400, 500. A web page of the web portal 602 can be accessed by a Uniform Resource Locator (URL) with an Internet browser using an Internet-capable communication device such as those described in FIGS. 1 and/or 2 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-576 to adapt these applications as may be desired by subscribers and/or service providers of the communication systems 100, 200, 400, 500. For instance, users of the services provided by the virtual gateway servers 114, 214, 430 can log into their on-line accounts and provision the servers 114, 214, 430 with rules and/or preferences related to the determination and reporting of contextual information. For example, a user may identify, e.g., in a user profile, one or more enterprise organizations, cloud service providers, and/or virtual resources. The user may also identify one or more context items, such as a user identity, equipment type(s), security information, such as username(s), password(s), and so on. Service providers can log onto an administrator account to provision, monitor and/or maintain the communication systems 100, 200 of FIGS. 1 and/or 2 and/or the virtual access gateway server 430.

Figure 7:
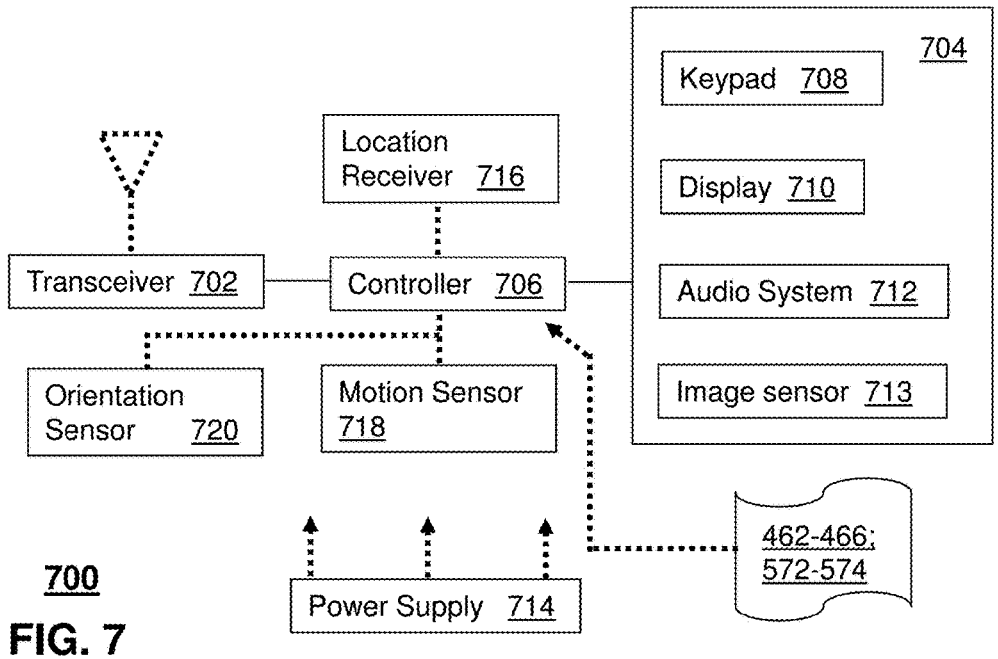
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1 and/or 2, and FIGS. 4-5. The communication device 700 in whole or in part can represent any of the communication devices described in FIGS. 1, 2, 4 and 5 and can be configured to perform portions of the process 300 of FIG. 3, and or corresponding actions that directly or indirectly support the process 300.

The communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of mobile devices 104, 204 of FIGS. 1 and/or 2, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems 100, 200 of FIGS. 1 and/or 2, communication systems 400-500 of FIGS. 4-5 such as a gaming console and a media player.

The communication device 700 shown in FIG. 7 or portions thereof can serve as a representation of one or more of the devices of system 100, 200 of FIGS. 1 and/or 2, communication system 400, and communication system 500. In addition, the controller 706 can be adapted in various embodiments to perform the functions 462-466 and 572-576, respectively.

Upon reviewing the aforementioned embodiments, it would be evident to an artisan with ordinary skill in the art that said embodiments can be modified, reduced, or enhanced without departing from the scope of the claims described below. For example, the virtual resources can be hosted by other communication and or processing devices, including other mobile devices. Such device(s) can be under the control of an individual, allowing an individual to provide managed access to virtual resources. Consider an individual hosting virtual access to a home computer to allow access to the user's desktop, applications and/or content.

Alternatively or in addition, access parameters can be determined and/or otherwise provided by one of the carrier service provider, a third party, the communication device or a combination thereof. It is conceivable that in at least some instances, the rules engine 126, 226, or some equivalent thereof can be hosted on the communication device 104, 204, allowing the communication device to determine access parameters on its own, once provided state variable(s) and/or a complete contextual frame of reference by another, such as the mobile carrier service provider. In still other instances, the rules engine 126, 226 or an equivalent thereof can be provided within the carrier network, e.g., the mobility network 102, 202. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
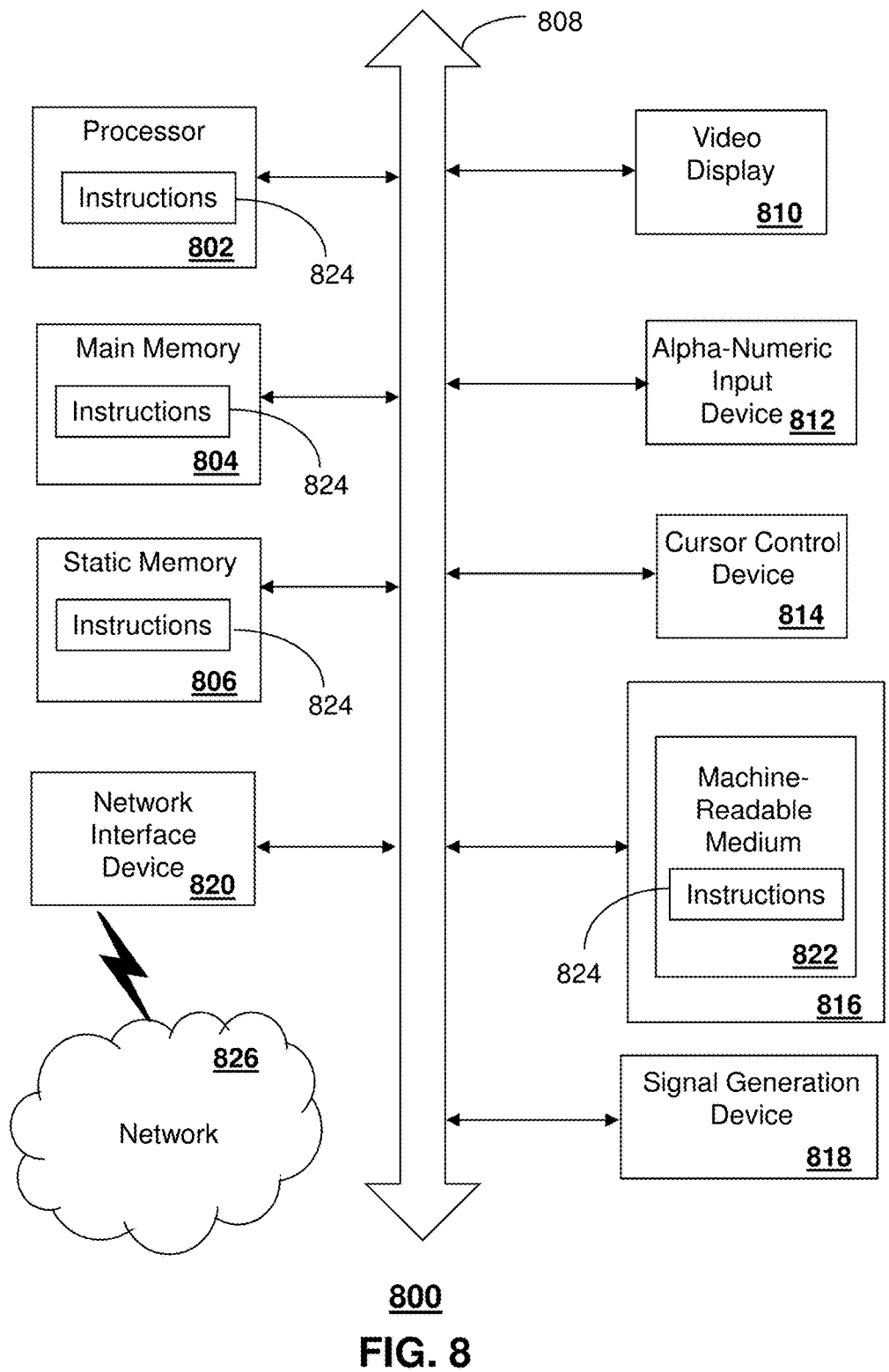
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the context source 116, 216, as the mobile carrier virtual mobile gateway 114, 260, as the enterprise virtual mobile gateway 124, 224, as the virtual resource manager 120, 220, as the rules engine 126, 226, as the virtual mobile gateway cloud manager 262, as the provider virtual mobile gateway cloud manager 232, as the virtual access gateway 430, the media processor 406. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

determining, by a network system comprising a processing system including a processor, a state of a mobile device operable within a mobility network, wherein the mobile device includes a client that interacts with a virtual resource manager to allow a user of the mobile device to access a first virtual resource of a first enterprise organization at a first location by way of a user interface at the mobile device, and wherein the determining the state of the mobile device comprises determining one of a make of the mobile device, a model of the mobile device, or both according to identification information associated with the mobile device;

determining, by the network system, a first contextual frame of reference of the mobile device based on the state of the mobile device and based on a determination that the mobile device is located at the first enterprise organization at the first location;

determining, by the network system, a first access parameter that includes first security settings that enables the mobile device to access the first virtual resource, wherein the first access parameter is determined based on the first contextual frame of reference of the mobile device;

forwarding, by the network system, the first access parameter to the mobile device by way of the mobility network, wherein a first user-selectable icon is determined based on the first access parameter for display by a graphical user interface of the mobile device, wherein the client is enabled to access the first virtual resource based on the first access parameter by way of the first user-selectable icon, and wherein the first virtual resource is hosted by another system remotely accessible to the mobile device by way of the mobility network;

determining, by the network system, a second contextual frame of reference of the mobile device based on a determination that the mobile device is located at a second location that is different from the first location;

determining, by the network system, a second access parameter that includes second security settings that enables the mobile device to access a second virtual resource of a second enterprise organization at the second location by way of the user interface, wherein the second access parameter is determined based on the second contextual frame of reference of the mobile device, wherein the second virtual resource of the second enterprise organization at the second location is independently operated from the first virtual resource of the first enterprise organization at the first location, and wherein the second access parameter is different from the first access parameter; and forwarding, by the network system, the second access parameter to the mobile device by way of the mobility network, wherein a second user-selectable icon is determined based on the second access parameter for display by the graphical user interface of the mobile device, wherein the client is enabled to access the second virtual resource of the second enterprise organization based on the second access parameter by way of the second user-selectable icon, and wherein the second user-selectable icon is different from the first user-selectable icon to distinguish the second enterprise organization from the first enterprise organization.

2. The method of claim 1, wherein the determining the state of the mobile device further comprises determining an identity of the user of the mobile device, and wherein the identification information comprises an equipment identification number.

3. The method of claim 2, wherein the determining the first access parameter comprises:
   forwarding, by the network system, the first contextual frame of reference of the mobile device to a knowledge engine to identify the first access parameter based on the first contextual frame of reference according to a predetermined rule; and
   receiving, by the network system, the first access parameter from the knowledge engine.

4. The method of claim 3, wherein the forwarding the first contextual frame of reference comprises forwarding, by the network system, the first contextual frame of reference of the mobile device to a gateway server of the first enterprise organization.

5. The method of claim 1, wherein the first contextual frame of reference comprises a characteristic of the first virtual resource, a security element upon which access to the first virtual resource depends or a combination thereof.

6. The method of claim 1, further comprising implementing the network system as a software defined network system, and wherein the first user-selectable icon is indicative of the first virtual resource.

7. The method of claim 1, further comprising updating, by the network system, a contextual frame of reference of the mobile device from the first contextual frame of reference to the second contextual frame of reference based on occurrence of an event that includes a change in location of the mobile device from the first location to the second location.

8. A network device comprising:
   a memory that stores executable instructions; and
   a processing system including a processor coupled to the memory, wherein the processing system, responsive to executing the instructions, facilitates performance of operations, the operations comprising:
   determining a first contextual frame of reference of a communication device operable within a communication network, wherein the communication device includes an application that interacts with a virtual resource manager to allow a user of the communication device to access a first virtual resource of a first enterprise organization at a first location, wherein the first contextual frame of reference comprises a state of the communication device and an identification that the communication device is located at the first location, and wherein the state of the communication device comprises one of a make of the communication device, a model of the communication device, or both according to identification information associated with the communication device;
   determining a first access parameter including first security settings that enables access to the first virtual resource, wherein the first access parameter is determined based on the first contextual frame of reference of the communication device;
   forwarding the first access parameter to the communication device by way of the communication network, wherein a first selectable element displayed at a graphical user interface of the communication device is determined based on the first access parameter, wherein the application of the communication device is enabled to access the first virtual resource based on the first access parameter by way of the first selectable element, and wherein the first virtual resource is hosted by another system remotely accessible to the communication device by way of the communication network;
   determining a second contextual frame of reference of the communication device based on a determination that the communication device is located at a second location, wherein the second location is different from the first location;
   determining a second access parameter that includes second security settings that enables the communication device to access a second virtual resource of a second enterprise organization at the second location, wherein the second access parameter is determined based on the second contextual frame of reference of the communication device, wherein the second virtual resource of the second enterprise organization at the second location is independently operated from the first virtual resource of the first enterprise organization at the first location, and wherein the second access parameter is different from the first access parameter; and
   forwarding the second access parameter to the communication device by way of the communication network, wherein a second selectable element displayed at the graphical user interface of the communication device is determined based on the second access parameter, wherein the application of the communication device is enabled to access the second virtual resource of the second enterprise organization based on the second access parameter by way of the second selectable element, and wherein the second selectable element is different from the first selectable element to distinguish the second enterprise organization from the first enterprise organization.

9. The network device of claim 8, wherein the state of the communication device further comprises an identity of the user of the communication device, and wherein the identification information comprises an equipment identification number.

10. The network device of claim 9, wherein the determining the first access parameter comprises:
    forwarding the first contextual frame of reference of the communication device to a rules engine that identifies the first access parameter based on the first contextual frame of reference according to a predetermined rule; and
    receiving the first access parameter.

11. The network device of claim 8, wherein the forwarding the first contextual frame of reference comprises forwarding the first contextual frame of reference of the communication device to a gateway server of the first enterprise organization.

12. The network device of claim 8, wherein the first contextual frame of reference comprises a characteristic of the first virtual resource, a security element upon which access to the first virtual resource depends or a combination thereof.

13. The network device of claim 8, wherein the operations further comprise implementing the network device as a software defined network entity, and wherein the operations further comprise sending the first selectable element to the communication device by way of the communication network.

14. The network device of claim 8, wherein the communication device is a mobile device operable within a mobility network, wherein the first selectable element is indicative of the first virtual resource, and wherein the processing system comprises a plurality of processors operating in a distributed processing environment.

15. A non-transitory machine-readable storage medium comprising executable instructions which, responsive to being executed by a processing system including a processor, cause the processing system to facilitate performance of operations, the operations comprising:

determining a first context of a communication device operable within a communication network, wherein the communication device interacts with a virtual resource manager to allow a user of the communication device to access a first virtual resource of a first enterprise organization at a first location via a user interface of the communication device, and wherein the determining the first context of the communication device comprises determining that the communication device is located at the first location and one of a make of the communication device, a model of the communication device, or both according to identification information associated with the communication device;

determining a first access parameter comprising first security settings that enables access to the first virtual resource, wherein the first access parameter is determined based on the first context of the communication device;

forwarding the first access parameter to the communication device by way of the communication network, wherein the communication device is enabled to access the first virtual resource based on the first access parameter and by way of a first user-selectable element presented at the user interface of the communication device, wherein the first user-selectable element is based on the first access parameter, and wherein the first virtual resource is hosted by another system remotely accessible to the communication device by way of the communication network;

determining a second context of the communication device based on a determination that the communication device is located at a second location, wherein the second location is different from the first location;

determining a second access parameter comprising second security settings that enables access to a second virtual resource of a second enterprise organization at the second location via the user interface, wherein the second access parameter is determined based on the second context of the communication device, wherein the second virtual resource of the second enterprise organization at the second location is independently operated from the first virtual resource of the first enterprise organization at the first location, and wherein the second access parameter is different from the first access parameter; and forwarding the second access parameter to the communication device by way of the communication network, wherein the communication device is enabled to access the second virtual resource based on the second access parameter and by way of a second user-selectable element presented at the user interface of the communication device, wherein the second user-selectable element is based on the second access parameter, and wherein the second user-selectable element is different from the first user-selectable element to distinguish the second enterprise organization from the first enterprise organization.

16. The non-transitory machine-readable storage medium of claim 15, wherein the determining the first context further comprises determining an identity of the user of the communication device, and wherein the identification information comprises an equipment identification number.

17. The non-transitory machine-readable storage medium of claim 16, wherein the determining the first access parameter comprises:

forwarding the first context of the communication device to a rules engine that identifies the first access parameter based on the first context according to a predetermined rule; and receiving the first access parameter.

18. The non-transitory machine-readable storage medium of claim 15, wherein the forwarding the first context comprises forwarding the first context of the communication device to a gateway server of the first enterprise organization, and wherein the processing system comprises a plurality of processors operating in a distributed processing environment.

19. The non-transitory machine-readable storage medium of claim 15, wherein the first context comprises a characteristic of the first virtual resource, a security element upon which access to the first virtual resource depends or a combination thereof.

20. The non-transitory machine-readable storage medium of claim 15, wherein the operations further comprise implementing a software defined network entity responsible for one of the determining the first context of the communication device, the determining the first access parameter based on the first context of the communication device, the forwarding the first access parameter to the communication device or a combination thereof.

* * * * *